(12) United States Patent
Cronin

(10) Patent No.: US 9,377,939 B1
(45) Date of Patent: Jun. 28, 2016

(54) APPLICATION PLAYER MANAGEMENT

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, Charleston, SC (US)

( * ) Notice: Subject to any disclaimer, the term of this patent is extended or adjusted under 35 U.S.C. 154(b) by 0 days.

(21) Appl. No.: 14/628,055

(22) Filed: Feb. 20, 2015

Related U.S. Application Data (60) Provisional application No. 62/007,889, filed on Jun. 4, 2014.

(51) Int. Cl.
- *G06F 3/00* (2006.01)
- *G06F 3/0484* (2013.01)
- *H04L 29/08* (2006.01)

(52) U.S. Cl.
CPC ............ *G06F 3/04842* (2013.01); *H04L 67/10* (2013.01)

(58) Field of Classification Search
CPC .............................. H04L 63/0263; G06Q 10/06
See application file for complete search history.

(56) References Cited

U.S. PATENT DOCUMENTS

| | | | |
|---|---|---|---|
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 2012/0131645 A1* | 5/2012 | Harm ................................. 726/4 |
| 2012/0210265 A1* | 8/2012 | Delia et al. ..................... 715/771 |
| 2013/0303192 A1 | 11/2013 | Louboutin | |
| 2013/0317835 A1 | 11/2013 | Mathew | |
| 2013/0328917 A1 | 12/2013 | Zambetti | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0332880 A1* | 12/2013 | Kim .................. H04N 5/44513 715/781 |

(Continued)

*Primary Examiner* — Omar Abdul-Ali
(74) *Attorney, Agent, or Firm* — Polsinelli LLP (57) ABSTRACT

Methods and systems for providing app player management are provided. Information may be stored in memory regarding a folder comprising a set of one or more applications in a priority order. Such a folder may further be associated with a trigger. It may be detected that the trigger associated with the folder has occurred. Based on and following detection that the trigger has occurred, the applications in the folder may be executed in the priority order. As such, the highest priority application may be executed first, and lower priority application(s) may be executed subsequently.

17 Claims, 6 Drawing Sheets

400

| User 405 | App Player Folders 415 | Apps 420 | Allow Sharing 445 | Suggest Genius 450 | Avail. To 3rd Parties 455 |
|---|---|---|---|---|---|
| User A (Jxxx.com) 410 | News Folder 425 | News Apps 430:<br>• USA Today<br>• BBC<br>• iGeeky | Y | N | N |
| | Finance Folder 435 | Finance Apps 440:<br>• eTrade<br>• Wall Street Journal | N | N | N |
| User B (FREDYZ.com) 460 | Morning Folder 465 | Morning Apps 470:<br>• Mail<br>• SMS<br>• Calendar | N | Y | N |
| | News Folder 475 | News Apps 480:<br>• Wall Street Journal<br>• Local paper<br>• USA Today | Y | Y | N |
| | Work Folder 485 | Work Apps 490<br>• Email<br>• Sales<br>• Timecard | Y | Y | Specific 3rd Party (Work.com/admin) 495 |

(56) References Cited

U.S. PATENT DOCUMENTS

| | | |
|---|---|---|
| 2014/0062773 A1 | 3/2014 | MacGougan |
| 2014/0065962 A1 | 3/2014 | Le |
| 2014/0071221 A1 | 3/2014 | Dave |
| 2014/0105084 A1 | 4/2014 | Chhabra |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0215474 A1 * | 7/2014 | Dong et al. ............ 718/102 |
| 2014/0222335 A1 | 8/2014 | Piemonte |
| 2014/0232633 A1 | 8/2014 | Shultz |
| 2014/0232634 A1 | 8/2014 | Piemonte |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0364089 A1 | 12/2014 | Lienhart |
| 2014/0364148 A1 | 12/2014 | Block |
| 2014/0365120 A1 | 12/2014 | Vulcano |
| 2015/0011242 A1 | 1/2015 | Nagaraj |
| 2015/0026623 A1 | 1/2015 | Horne |
| 2015/0031397 A1 | 1/2015 | Jouaux |

\* cited by examiner

- 205 • Airplane Mode
- 210 • Manage App Player  [ON|OFF]
- 215    ○ "Morning App Player"  [ON|OFF]
  - 220   - Allow sharing  [ON|OFF]
  - 225   - Allow Open/Sync/Close for each app in order  [ON|OFF]
  - 230   - Place in calendar for execute  [ON|OFF]
    Day    M T W Th F Sa Su
    Time    7:30 AM
    Notify when done  [ON|OFF]
  - 235   - Watch Player  [ON|OFF]
  - 240   - Use Networks
         ALL  [ON|OFF]
         ONLY WIFI  [ON|OFF]
         Additional networks . . .
  - 245   - Step through Apps command
  - 250     - Toggle for execution  [ON|OFF]
  - 255     - Timer  [ON|OFF]
    [3] minutes per app
  - 260     - Toggle [1x] for forward app; [2x] for reverse  [ON|OFF]
  - 265   - Audio/Tone  [ON|OFF]
- 270 • Additional Players . . .

| 400 | | | | | |
|---|---|---|---|---|---|
| User 405 | App Player Folders 415 | Apps 420 | Allow Sharing 445 | Suggest Genius 450 | Avail. To 3rd Parties 455 |
| User A (Jxxx.com) 410 | News Folder 425 | News Apps 430:<br>• USA Today<br>• BBC<br>• iGeeky | Y | N | N |
| | Finance Folder 435 | Finance Apps 440:<br>• eTrade<br>• Wall Street Journal | N | N | N |
| User B (FREDYZ.com) 460 | Morning Folder 465 | Morning Apps 470:<br>• Mail<br>• SMS<br>• Calendar | N | Y | N |
| | News Folder 475 | News Apps 480:<br>• Wall Street Journal<br>• Local paper<br>• USA Today | Y | Y | N |
| | Work Folder 485 | Work Apps 490<br>• Email<br>• Sales<br>• Timecard | Y | Y | Specific 3rd Party (Work.com/admin) 495 |

APPLICATION PLAYER MANAGEMENT

CROSS-REFERENCE TO RELATED APPLICATIONS

The present application claims the priority benefit of U.S. provisional application No. 62/007,889 filed Jun. 4, 2014 and entitled "Application Player Management," the disclosure of which is hereby incorporated by reference.

BACKGROUND OF THE INVENTION

1. Field of the Invention

The present invention generally relates to management of applications. More specifically, the present invention relates to an application management system on mobile devices.

2. Description of the Related Art

The term "app" is a commonly-used abbreviation of the term "application software." In many contexts, "app" is also commonly-used to refer specifically to mobile applications. Mobile applications (or "mobile apps") are application software designed to run on smartphones, tablet computers (including electronic reading devices or e-readers), and other mobile devices. Apps may be made available by application developers through application distribution platforms, many of which are typically operated by the owner of the mobile operating system, such as the Apple® App Store℠, Google Play™, Windows® Store, and BlackBerry® App World™. Some apps are available for free, while others must be bought. Usually, such apps are downloaded from the platform to a target device, such as an iPhone®, BlackBerry®, Android®, or Windows® phone, other mobile device, laptop, or desktop computer.

Mobile apps were originally offered for general productivity and information retrieval, including email, calendar, contacts, stock market, and weather information. However, public demand and the availability of developer tools drove rapid expansion into other categories, such as mobile games, factory automation, GPS, and location-based services, banking, order-tracking, and ticket purchases. The explosion in number and variety of apps made discovery a challenge, which in turn led to the creation of a wide range of review, recommendation, and curation sources, including blogs, magazines, and dedicated online app-discovery services.

Generally, applications (apps) can be loaded and then executed on an electronic computing device. Available operating systems on such devices may further allow for organization of applications into folders, groups, etc. Moreover, applications may be added or deleted by the user as desired. In addition, user settings may control how certain apps may be executed on the mobile device. Apps are, however, limited as there is currently no way to for an app to self-execute in the mobile operating system. For example, there is no automatic synchronizing of an app and no ability to use folders as a control system for apps.

There is, therefore, a need in the art for improved systems and methods for application player management.

SUMMARY OF THE CLAIMED INVENTION

Embodiments of the present invention provide methods and systems for application player management. Information may be stored in memory regarding a folder comprising a set of one or more applications in a priority order. Such a folder may further be associated with a trigger. It may be detected that the trigger associated with the folder has occurred. Based on and following detection that the trigger has occurred, the applications in the folder may be executed in the priority order. As such, the highest priority application may be executed first, and lower priority application(s) may be executed subsequently.

Various embodiments of the present invention may include methods for application player management. Such methods may include storing information in memory regarding a folder associated with a trigger and comprising a set of one or more applications in a priority order, detecting that the trigger associated with the folder has occurred, and executing the applications in the folder. Moreover, the execution of the applications may occur based on the priority order, such that a highest priority application may be executed first and lower priority application(s) executed subsequently.

Embodiments may further include apparatuses for application player management. Such apparatuses may include memory that stores information regarding a folder associated with a trigger and comprising a set of one or more applications in a priority order, and a processor that executes instructions to detect that the trigger associated with the folder has occurred and to execute the applications in the folder in the priority order. In some embodiments, such apparatuses may further include communication interfaces for communicating information over a communication network with databases, such as an app player management database or third party database.

Embodiments of the present invention may further include non-transitory computer-readable storage media, having embodied thereon a program executable by a processor to perform methods for providing application player management as described herein.

DETAILED DESCRIPTION

Embodiments of the present invention provide methods and systems for application player management. Information may be stored in memory regarding a folder comprising a set of one or more applications in a priority order. Such a folder may further be associated with a trigger. It may be detected that the trigger associated with the folder has occurred. Based on and following detection that the trigger has occurred, the applications in the folder may be executed in the priority order. As such, the highest priority application may be executed first, and lower priority application(s) may be executed subsequently.

Figure 1:
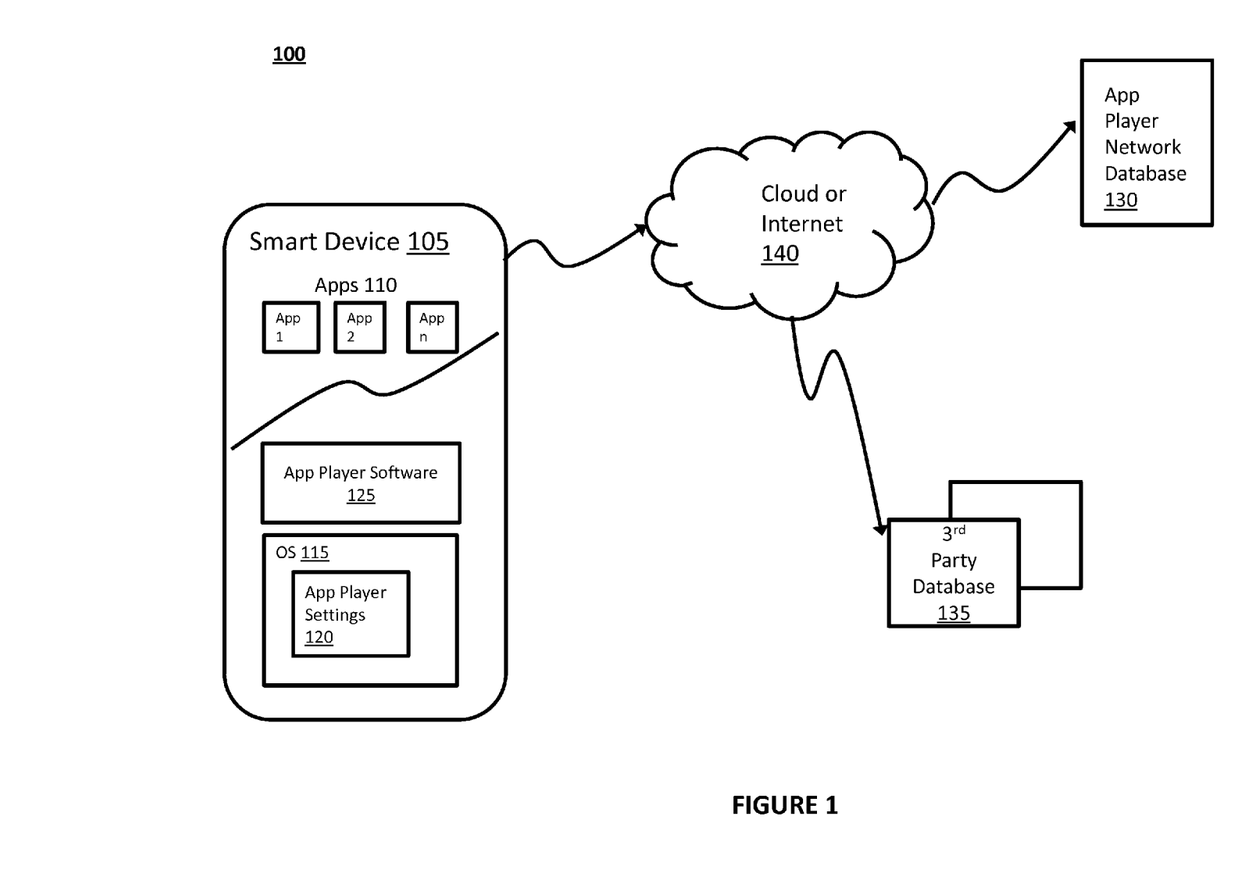
FIG. 1 illustrates an exemplary network environment in which a system for providing app player management may be implemented.

FIG. 1 illustrates an exemplary network environment 100 in which a system for providing app player management may be implemented. Network environment 100 includes smart device 105 (which includes apps 110, operating system 115, app player settings 120, and app player software 125), app player network database 130, and third party database 135. The devices in network environment 100 may communicate with each other via cloud communication network 140.

Users may use any number of different electronic user devices 105, such as general purpose computers, mobile phones, smartphones, personal digital assistants (PDAs), portable computing devices (e.g., laptop, netbook, tablets), desktop computing devices, handheld computing device, or any other type of computing device capable of communicating over cloud communication network 140. User devices 105 may also be configured to access data from other storage media, such as memory cards or disk drives as may be appropriate in the case of downloaded services. User device 105 may include standard hardware computing components such as network and media interfaces, non-transitory computer-readable storage (memory), and processors for executing instructions that may be stored in memory.

Applications 110 may include any number of software applications installed on the user device 1105, including native applications (e.g., Notes, Messages, Camera, FaceTime, Weather, etc. on iPhone) and downloaded applications, which may include various social media applications (e.g., Facebook®, Twitter®, Instagram®).

Operating system (OS) 115 is a collection of software that manages computer hardware resources and provides common services for computer programs, including applications 110. The operating system 116 is an essential component of the system software in a computer system. Applications 110 are usually developed for a specific operation system 115 and therefore rely on the associated operating system 115 to perform its functions. For hardware functions such as input and output and memory allocation, the operating system 115 acts as an intermediary between applications 110 and the computer hardware. Although application code is usually executed directly by the hardware, applications 110 may frequently make a system call to an OS function or be interrupted by it. Operating systems 115 can be found on almost any device with computing or processing ability. Examples of popular modern operating systems include Android, BSD, iOS, Linux, OS X, QNX, Microsoft Windows, Windows Phone, and IBM z/OS. Most of these (except Windows, Windows Phone and z/OS) may share roots in UNIX.

App player settings 120 may be a software function that opens a display that lists OS functions related to application player management. Such a list may be generated upon selection of a user interface button. Operating system functions may be associated with various options that allow the user to designate certain preferences or settings with respect to how certain operating system functions are performed (e.g., display preferences, wireless network preferences, information sharing, accessibility of applications to system information, such as GPS/location, notifications). App player settings 120 may specifically allow the user to designate which apps 110 are to be executed together and the order in which the apps 110 are to be executed. Once these app player settings 120 are set, the operating system 115 uses the app player settings 120 to perform various functions, which includes functions related to execution of the app player software 125.

App player software 125 allow for creation of a folder of applications that are to be executed automatically upon detection of a trigger. Creating such a folder may involve giving the folder a name, defining the trigger (e.g., time of day), and specifying a set of applications. For example, the user may wish to create a folder called "News," designate a trigger of 7 AM, and select the CNN, BBC News, and Facebook applications. As such, when smart device 105 detects that the current time is 7 AM, the selected applications automatically execute, connect to the cloud communication network 140, and refresh their content. As such, when the user selects any one of the applications at a later time, the news content reflects the latest news as of at least 7 AM.

A user may also create a folder named Work Apps to refresh work-related apps (e.g., email). For example, the user may set the folder to execute and refresh at 6:30 AM, the work email application may be executed to download all new emails. As such, the user may wake at 7 AM and begin to review new emails immediately and without having to wait for long files to download. Likewise, such a folder may include an app such as Salesforce.com, which needs to be opened and synchronized daily. The Work Apps folder may further open a timecard or another time-recording app to capture when a user woke up. While date (as determined by calendar) and time (as determined by clock) may be used as triggers, the user may alternatively set the trigger to be changes detected by one or more sensors (e.g., accelerometer). When the accelerometer is moved, for example, a user's basic calendar may be opened up, and a timecard created showing that the user has started work.

Another example may be apps related to family. App player software 125 may be used to create a Family App Player folder. Such a folder may allow for automated execution of a photo stream app so as to be able to automatically download photos, as well as upload/share photos. Such a folder may further include certain types of music to be played when the user is with family members. The Family App Player can open up iTunes and access the music folders that the user specifies as music for family. When the user is around family, the user may wish for all associated information to relate to family, including the most recent photographs of family, etc., in one place. Such a user may actually have already created a photo folder with recent photos with family, amongst others. By selecting the Family App Player folder and the family photo folder, app player software 125 may automatically interoperate with the photos in the pre-existing photo folder to organize family photos to show the most recent family photos, etc.

Alternatively, a user might have downloaded a new app that they want to show their family members at the next family event. The user may thus put that app into the Family App Player to be executed at the next family event. Opening the Family App Player may further allow for the app and/or related data to be shared to designated family members. Such shared data may include, for example, a PDF document or e-book that may be viewed via a particular app.

Another possible embodiment may allow for creation of a Travel App Player folder for apps to be used during travel. For instance, a user might have Yelp, Hertz.com, one or more airline apps, and other apps related to a trip. These apps may further be set up for actual travel. Right before a trip, a user may put them in the calendar. If the user is leaving at 2:00 PM, the Travel App Player may be scheduled to open at 1:30 PM and to load current information. The user may further have the ability to open and close apps as needed from the folder. As such, if the user allows a folder to be opened at a certain time, each of the apps might be opened and closed automatically. There may also be some apps that do not open and close automatically in the folder, but are included for further reference. There may be, therefore, a combination of executable apps and apps used only when the folder is opened up by a person.

A Game App Player folder may include various games. There might be, for example, certain games that are interoperable. When the user opens the game, the user may be provided with a view of current scores (e.g., score leader). The user can actually put such an app into a calendar, so that at the end of the day, the game opens to refresh the most recent scores, as well as sending the user's scores for comparison and possible inclusion in a highest scores list.

An Evening App Player folder may include apps generally used in the evening. Defined by the user in accordance with personal preferences, such a folder may include news apps, e-book reader apps (e.g., Bible, Kindle), SMS or other messaging apps, social network apps, etc., which may be set to refresh at a time shortly prior to the time the user expects to need such apps. For apps that do not refresh or do not need regular refreshing, inclusion in the folder allows for greater ease in toggling between the apps therein.

A Music App Player folder may include all the apps that have to do with music. Some apps allow the user to share music via Bluetooth, and by including such apps in the Music App Player folder, the user may schedule the apps to execute in the morning, such that the user may wake up to certain music played through a Bluetooth device. As such, the app is opened, the music is opened, the Bluetooth is opened automatically, and the user wakes up to music at a specific time.

A Health App Player folder may include apps with information associated with health (e.g., health service providers, prescriptions, nutrition, exercise trackers). Such a folder may include app relating to health and fitness apps. The user may decide to review health metrics on a weekly basis. For example, the user may review health goals every Saturday morning in conjunction with current health and fitness data. In addition, a user taking prescription drugs at a certain time of day may schedule the Health App Player folder to execute at those times so as to provide a reminder, to log when the prescription meds are taken or not, and to communicate such information to a health care provider.

App player network database 130 may receive data from one or more smart devices 105 of users who wish to share data regarding how they use application player software 125 to manage their applications. For example, a user may wish to share such data with their friends (e.g., designated contacts) and to see corresponding data regarding their friends. Such sharing may occur in association with social networks.

App player network database 130 may be any type of database known in the art for communicating over cloud communication network 140 and storing data related to application player management. App player network database 130 may be part of any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

Third party database 135 may include any party that may participate in the application player management. Such third party networks 135 may include application developers that may wish to see how their respective applications are being used. Such third party databases 135 may obtain information on users and their application adoption and usage habits and preferences.

Communication network 140 may be a local, proprietary network (e.g., an intranet) and/or may be a part of a larger wide-area network. Communication network 140 may comprise a variety of connected computers that may provide a set of network-based services. Such network service may be provided by real server hardware and/or by virtual hardware as simulated by software running on one or more real machines. Such virtual servers may not physically exist and can therefore be moved around and scaled up (or down) on the fly without affecting end-users (e.g., like a cloud).

Communication network 140 allow for communication between the smart device 105, app play network database 130, and third party database 135 via various communication paths or channels. Such paths or channels may include any type of data communication link known in the art, including TCP/IP connections and Internet connections via Wi-Fi, Bluetooth, UMTS, etc. In that regard, communications network 140 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider.

Figure 2:
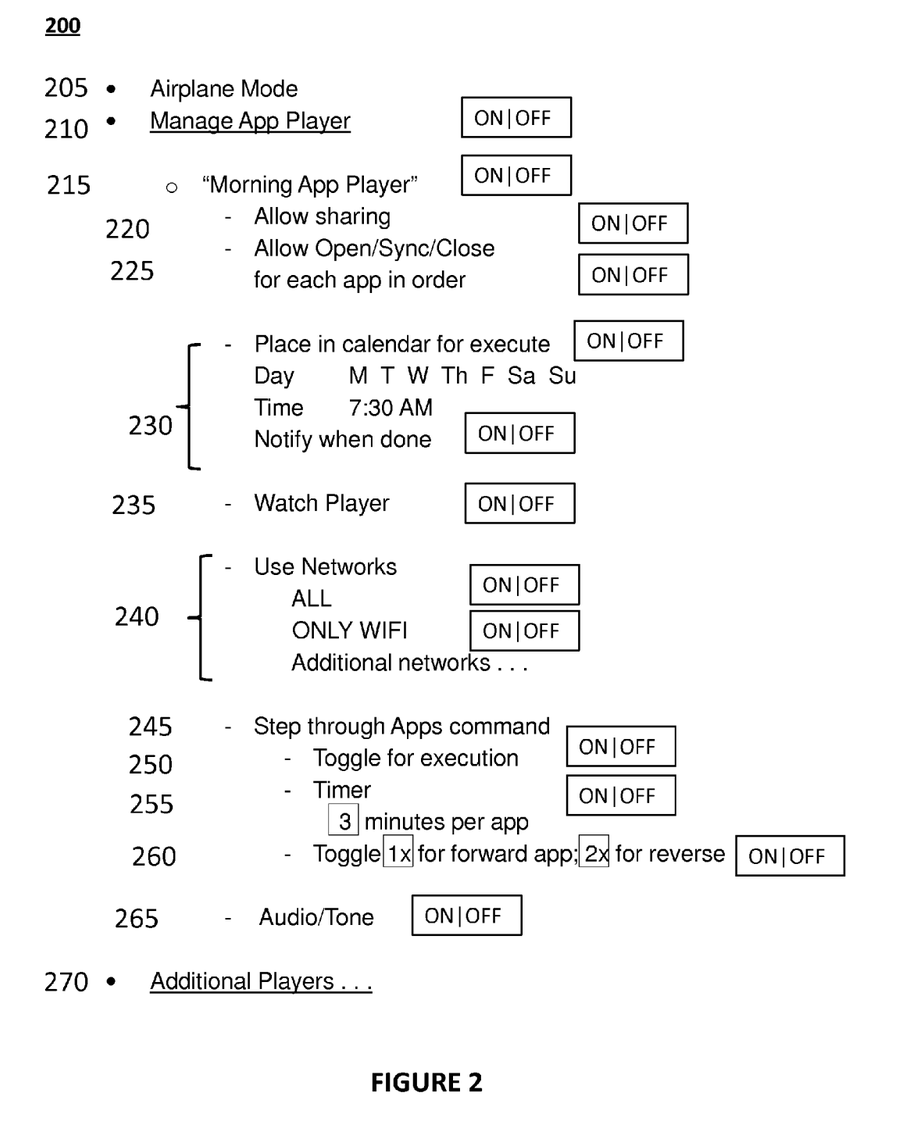
FIG. 2 illustrates exemplary settings on a mobile device that may be used with a system for providing app player management.

FIG. 2 illustrates exemplary settings 200 on a mobile device that may be used with a system for providing app player management. Such settings may include such general settings as airplane mode 205, as well as settings specifically relating to app player management 210. When app play management 210 is enabled, the user may be allowed to select further options regarding morning app play 215, allow sharing 220, allow open/sync/close for each app in order 225, place in calendar for execution 230 (including sub-options for day, time, and notifications when done), watch player 235, use networks 240 (including sub-options for all, only WiFi, or other networks to be added), step through apps command 245, toggle for execution 250, timer 255 (including sub-option for defining duration), toggle forward or backward 260, audio/tone 265, and additional players to be added 270.

Specifically, a user may create a folder for morning app play 215. With respect to such a folder, the user may further select certain options. Allow sharing 220 allows for sharing with designated contacts and/or with third parties. Allow open/sync/close for each app in order 225 enables the refresh of multiple applications in the folder in a designated order.

Place in calendar for execution 230 allows for execution of the morning app play folder 215 in accordance with a specific day or time, as designated by the user. The user may further indicate a wish to receive a notification once such execution/refresh is complete.

Watch player 235 allows for a visual display corresponding to opening of the folder and applications therein, as well as execution/refresh of the apps in the morning app play folder 215.

Use networks 240 allows the user to designate which communication networks may be preferred. The user may further designate a minimum level of connectivity before the execution is allowed to occur. Conversely, the user may designate that the user device use any and all available networks to obtain data (e.g., 3G, 4G, WiFi).

Step through apps command 245 allows for a customized user interface with a toggle. For example, the user may wake up after the schedule refresh and open the first app for reading news. When the user is done reading a first app (e.g., USA Today), the user may use the toggle to automatically open the next app in priority (e.g., Wall Street Journal) to the respective refreshed content therein.

Toggle for execution 250 allows the user to refresh again in real-time via the toggle user interface. For example, the morning app player folder may include both news apps, an email app, and a phone app. In that regard, the user may toggle through the news apps to read news content, then toggle to the email app to read and respond to emails, as well as make phone calls. As such, the toggle interface may allow not only for opening of the app, but also execution of functions specific to the app.

Timer 255 allows for toggling to occur based on a timer. For example, the user may wish to read only headlines and scroll cursorily through each news source a few minutes at a time. The timer 255 may allow for timing notifications so as to remind the user to toggle through to the next news source, or the timer 255 may automatically toggle to the next app without further user input.

Toggle forward or backward 260 allows the user to define gestures or shortcuts for toggling forward (from highest priority to lower) as well as backward (from lower priority to higher).

Audio/tone 265 may be used to associate an audio or tone notification for events occurring or being performed by the app player management system. For example, a tone may ring when an app has been executed or when the timer has measured a specified duration.

Figure 3:
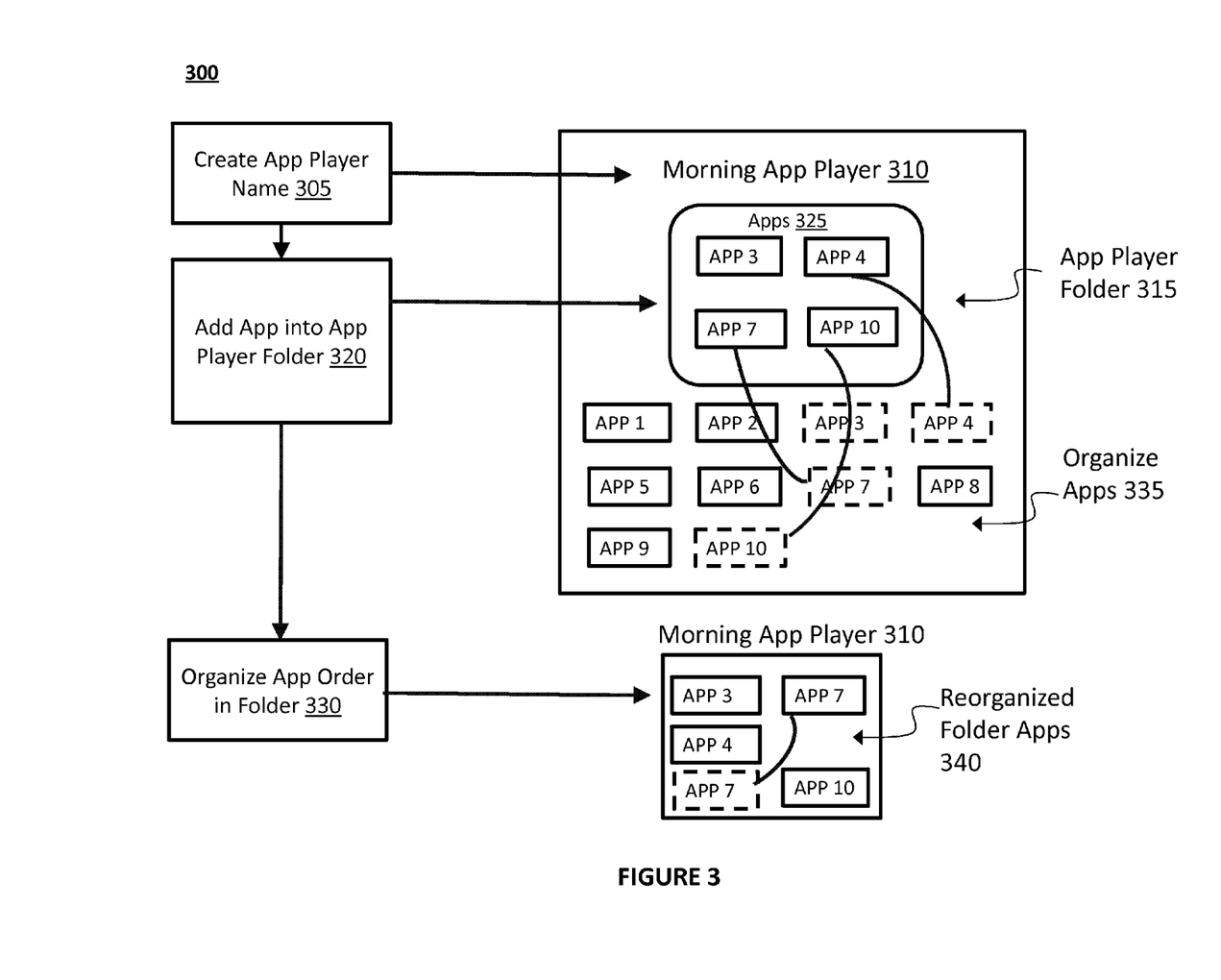
FIG. 3 illustrates exemplary application management options that may be used with a system for providing app player management.

FIG. 3 illustrates exemplary application management options 300 that may be used with a system for providing app player management. Once app player management has been enabled in operating system settings (illustrated in FIG. 2), the user may then create an app player folder.

In step 305, an app player folder may be created and name. As illustrated, the user may have created an app play folder 315 for apps to be executed in the mornings. As such, the user may name such folder Morning App Player 310.

In step 320, the user may add one or more apps to the app player folder. Such apps may be selected from a variety of apps available on a mobile device. As illustrated, the available apps are Apps 1-10, and the user has selected Apps 3, 4, 7, and 10. In some embodiments, the user may be provided with an interface listing all apps in an organized manner 335 for ease of search and selection. As such, the selected apps 325 are identified as part of the Morning App Player folder for automated execution.

In step 330, the user may organize the apps in the folder. As illustrated, the original order of the selected app 325 listed App 3, 4, 7, and 10 in number order (starting from top left and going right, then beginning in the next row and going right). As reorganized in reorganized folder 340, the order has been changed to App 3, 7, 4, and 10. App 7 has been moved to precede App 4. In such a manner, the user may prioritize certain apps to execute or refresh before others.

Figure 4:
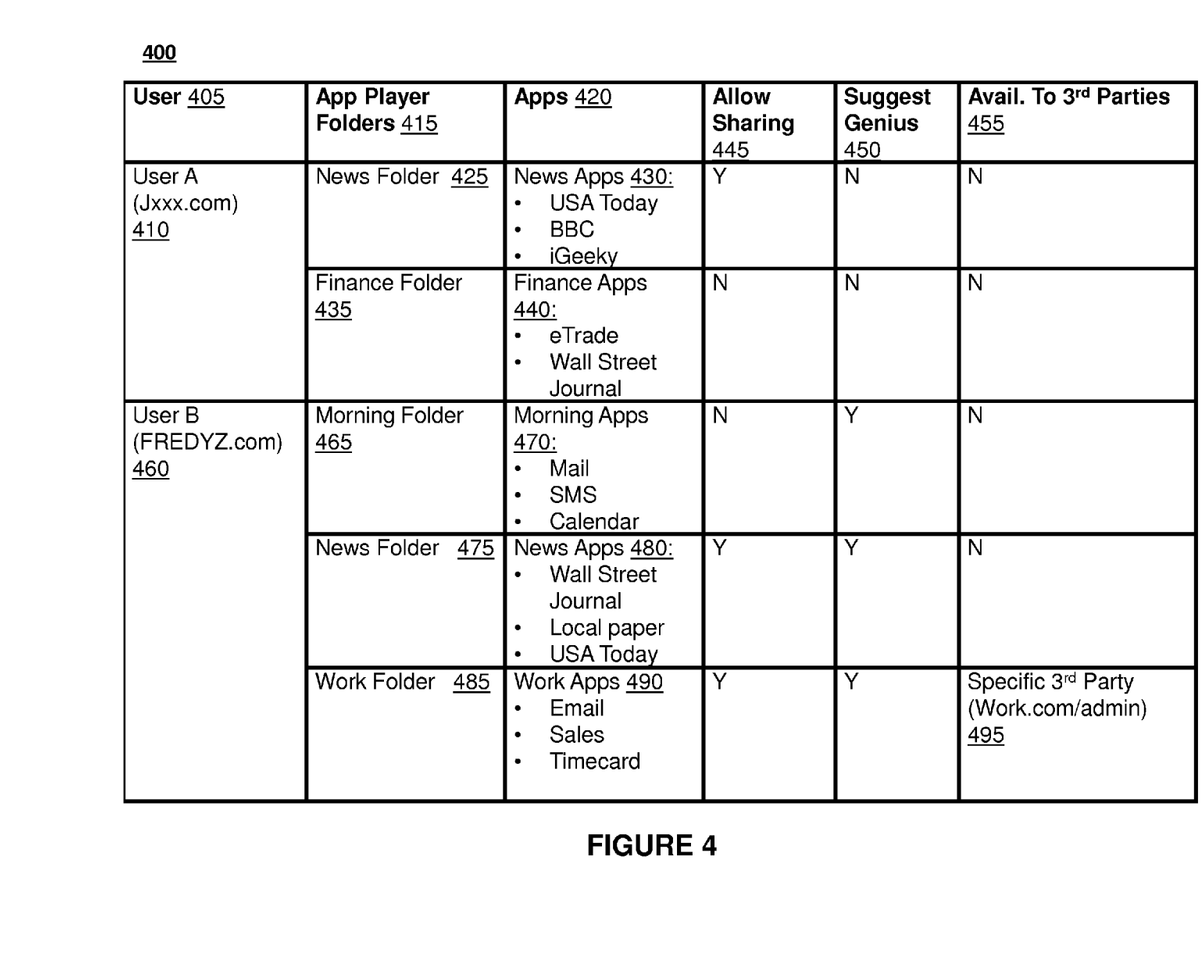
FIG. 4 illustrates an exemplary database that may be used with a system for providing app player management.

FIG. 4 illustrates an exemplary database 400 that may be used with a system for providing app player management. Such a database 400 may be at a cloud server or other remote device that receives information regarding app player management from a variety of users. Such information may be stored for the user's benefit (e.g., restoring devices, initializing new devices). In addition, the user may allow their information to be shared (e.g., publicly, with selected contacts), as well as request to view information regarding how other users are implementing app player management.

Database 400 may track information regarding user 405, app player folders 415, selected app therein 420, allow sharing 445, suggest genius 450, and availability to third parties 455. Specific examples are illustrated in the rows below.

User 405 is a column for tracking user information. Specific examples of user information include User A (Jxxx.com) 410 and User B (FREDYZ.com) 460. While the users may be listed by domain name or uniform resource locator (URL), any identifying information or identifier may be used.

App Player Folder 415 is a column for tracking app player folders. As illustrated, User A (Jxxx.com) 410 has two app player management folders: News Folder 425 and Finance Folder 435. User B (FREDYZ.com) 460 has three app player management folders: Morning Folder 465, News Folder 475, and Work Folder 485.

Apps 420 is a column for tracking which apps are included in each app player management folder. As illustrated, News Folder 425 includes News Apps 430 (USA Today, BBC, and iGeeky); Finance Folder 435 includes Finance Apps 440 (eTrade, Wall Street Journal); Morning Folder 465 includes Morning Apps 470 (Mail, SMS, Calendar); News Folder 475 includes News Apps 480 (Wall Street Journal, local paper, and USA Today); and Work Folder 485 includes Work Apps 490 (email, sales, and timecard).

Allow sharing 445 is a column tracking a user selection as to whether the user wishes to share each of their folder with others. As illustrated, a user may choose to share one folder, but not another.

Suggest genius 450 is a column tracking a user selection as to whether the user is interested in receiving suggestions for apps to include in the folder based on apps already included, related apps, what others users group with such apps, and any other parameters for predicting, extrapolating, or detecting trends regarding what apps may be of interest for inclusion in an app player management folder.

Availability to third parties 455 is a column tracking a user selection as to whether the user wishes to share their folders with third parties. Such third parties are generally those that may be unconnected to the user (e.g., not a contact or part of any of their social networks). Rather, such third parties may include application developers, service providers, advertisers, researchers, etc., who may be interested in data regarding how users use certain applications.

Figure 5:
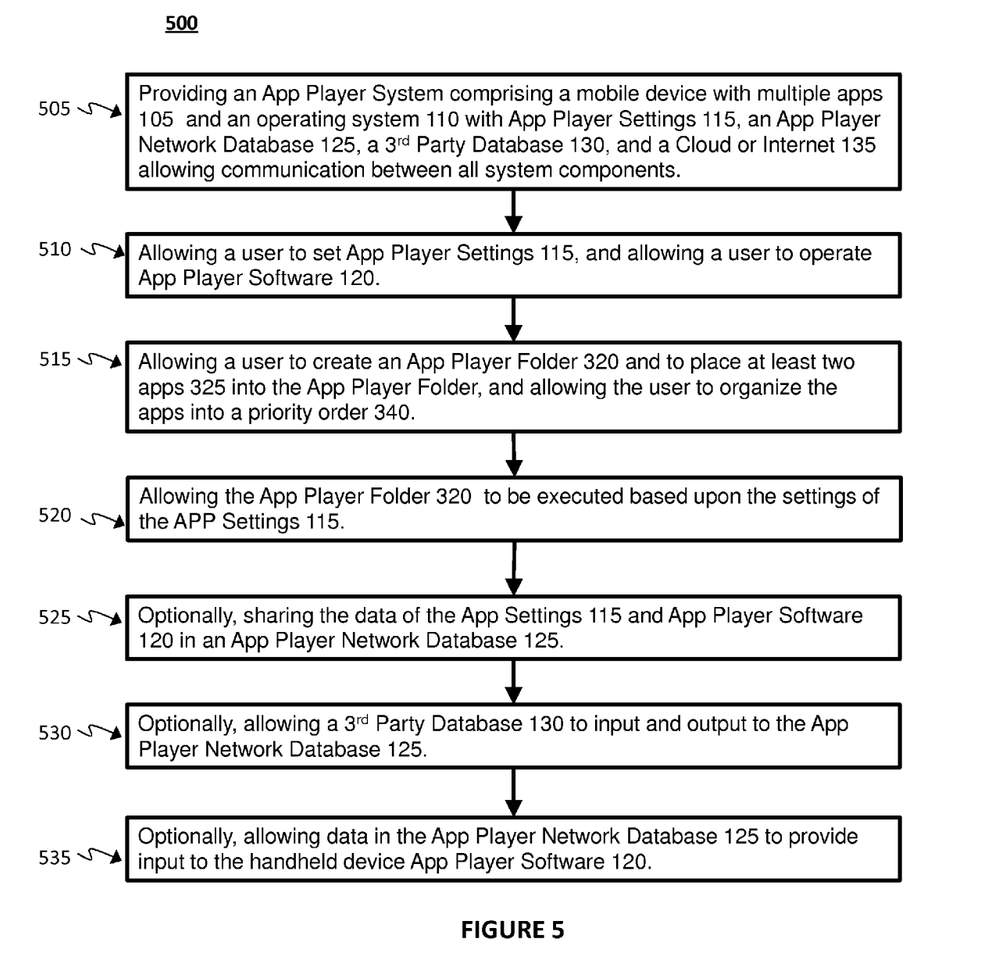
FIG. 5 is a flowchart illustrating an exemplary method for providing app player management.

FIG. 5 is a flowchart illustrating an exemplary method 500 for providing app player management. In step 505, a mobile device may be provided with the app player management software, as well as with the operating system functions and tools required to execute the same. In addition, the mobile device may be set up to communicate wirelessly over a communication network (e.g., with remote devices or database).

In step 510, a user may initialize the app player management software to operate based on operating system settings regarding user preferences or needs. Such settings control how the app player management software is to be implemented (e.g., allow sharing, notifications).

In step 515, the user may create an app player folder. Creating an app player folder may include providing a name, selection of one or more apps, and a priority order for such apps. Such a folder may be associated with a trigger, which may be defined in either step 510 (via operating system settings) or in step 515.

In step 520, the trigger may be detected, and the applications in the folder may then be automatically executed in the specified order. Such execution may merely involve opening the application, refreshing its data (via a communication network), and closing out the application. Such scheduled group execution allows for groups of applications to refresh and provide current data as of the scheduled time.

In step 525, the user data may be shared regarding operating settings specific to app player management, as well as data created by the app player management software (e.g., folders, changes, preferences). Such data may be shared over a communication network with a remote database for storing data regarding app player management from multiple users.

In step 530, a third party database may be allowed to access, input, and receive data regarding a user's implementation of app player management. Such a third party database may likewise be remote from the user device(s) that are implementing app player management and generating data regarding the same.

In step 535, information may also be received from the app player management database. Such received information may include information regarding other users, recommendations, trends, and other related data.

Figure 6:
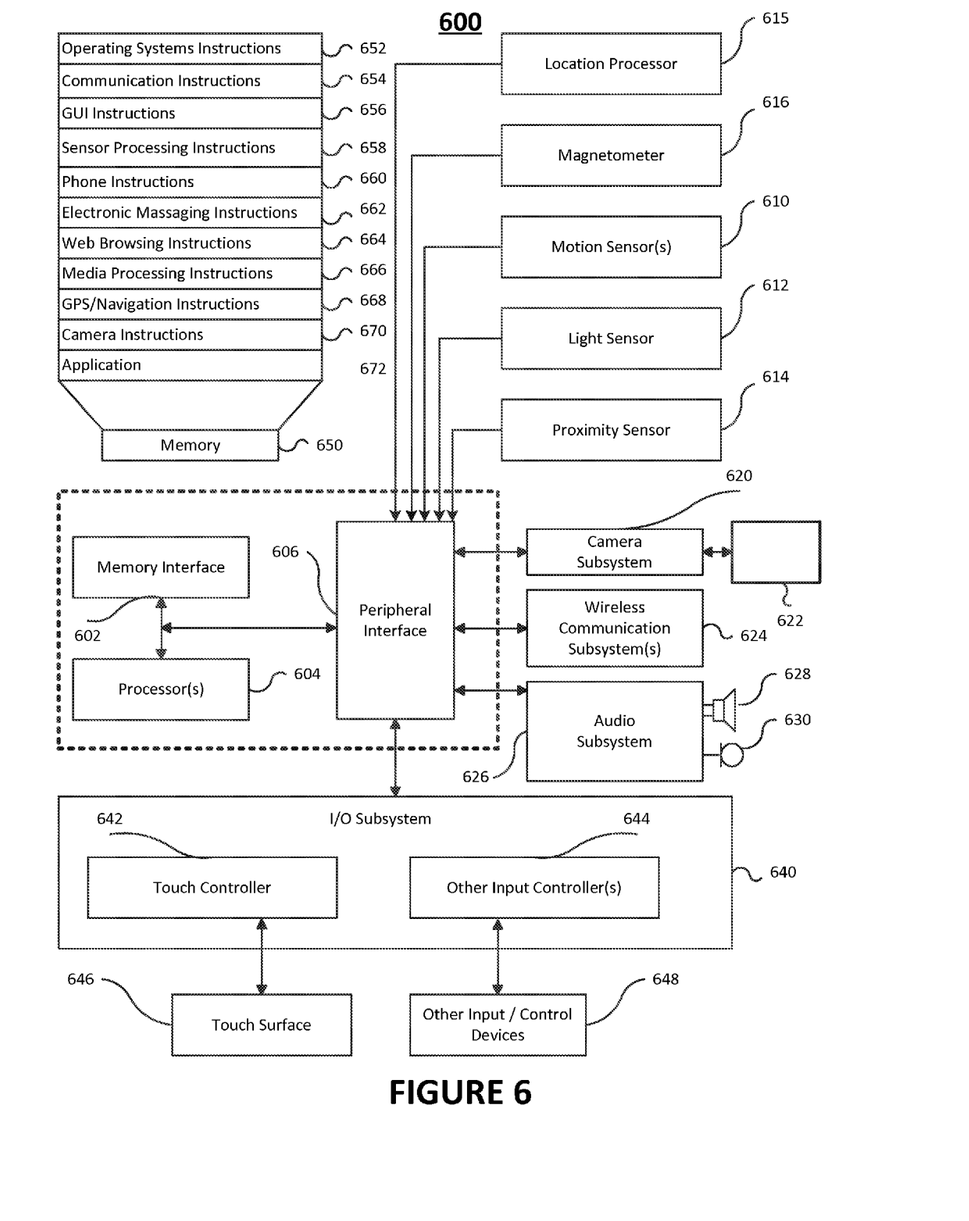
FIG. 6 illustrates a mobile device architecture that may be utilized to implement the various features and processes described herein.

FIG. 6 illustrates a mobile device architecture 600 that may be utilized to implement the various features and processes described herein. Architecture 600 can be implemented in any number of portable devices including but not limited to smart phones, electronic tablets, and gaming devices. Architecture 600 as illustrated in FIG. 6 includes memory interface 602, processors 604, and peripheral interface 606. Memory interface 602, processors 604 and peripherals interface 606 can be separate components or can be integrated as a part of one or more integrated circuits. The various components can be coupled by one or more communication buses or signal lines.

Processors 604 as illustrated in FIG. 6 is meant to be inclusive of data processors, image processors, central processing unit, or any variety of multi-core processing devices. Any variety of sensors, external devices, and external subsystems can be coupled to peripherals interface 606 to facilitate any number of functionalities within the architecture 600 of the exemplar mobile device. For example, motion sensor 610, light sensor 612, and proximity sensor 614 can be coupled to peripherals interface 606 to facilitate orientation, lighting, and proximity functions of the mobile device. For example, light sensor 612 could be utilized to facilitate adjusting the brightness of touch surface 646. Motion sensor 610, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 606, such as a temperature sensor, a biometric sensor, or other sensing device to facilitate corresponding functionalities. Location processor 615 (e.g., a global positioning transceiver) can be coupled to peripherals interface 606 to allow for generation of geo-location data thereby facilitating geo-positioning. An electronic magnetometer 616 such as an integrated circuit chip could in turn be connected to peripherals interface 606 to provide data related to the direction of true magnetic North whereby the mobile device could enjoy compass or directional functionality. Camera subsystem 620 and an optical sensor 622 such as a charged coupled device (CCD) or a complementary metal-oxide semiconductor (CMOS) optical sensor can facilitate camera functions such as recording photographs and video clips.

Communication functionality can be facilitated through one or more communication subsystems 624, which may include one or more wireless communication subsystems. Wireless communication subsystems 624 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 624 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 624 may include hosting protocols such that the device may be configured as a base station for other wireless devices. Communication subsystems can also allow the device to synchronize with a host device using one or more protocols such as TCP/IP, HTTP, or UDP.

Audio subsystem 626 can be coupled to a speaker 628 and one or more microphones 630 to facilitate voice-enabled functions. These functions might include voice recognition, voice replication, or digital recording. Audio subsystem 626 in conjunction may also encompass traditional telephony functions.

I/O subsystem 640 may include touch controller 642 and/or other input controller(s) 644. Touch controller 642 can be coupled to a touch surface 646. Touch surface 646 and touch controller 642 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 646 may likewise be utilized. In one implementation, touch surface 646 can display virtual or soft buttons and a virtual keyboard, which can be used as an input/output device by the user.

Other input controllers 644 can be coupled to other input/control devices 648 such as one or more buttons, rocker switches, thumb-wheels, infrared ports, USB ports, and/or a pointer device such as a stylus. The one or more buttons (not shown) can include an up/down button for volume control of speaker 628 and/or microphone 630. In some implementations, device 600 can include the functionality of an audio and/or video playback or recording device and may include a pin connector for tethering to other devices.

Memory interface 602 can be coupled to memory 650. Memory 650 can include high-speed random access memory or non-volatile memory such as magnetic disk storage devices, optical storage devices, or flash memory. Memory 650 can store operating system 652, such as Darwin, RTXC, LINUX, UNIX, OS X, ANDROID, WINDOWS, or an embedded operating system such as VxWorks. Operating system 652 may include instructions for handling basic system services and for performing hardware dependent tasks. In some implementations, operating system 652 can include a kernel.

Memory 650 may also store communication instructions 654 to facilitate communicating with other mobile computing devices or servers. Communication instructions 654 can also be used to select an operational mode or communication medium for use by the device based on a geographic location, which could be obtained by the GPS/Navigation instructions 668. Memory 650 may include graphical user interface instructions 656 to facilitate graphic user interface processing such as the generation of an interface; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes, camera instructions 670 to facilitate camera-related processes and functions; and instructions 672 for any other application that may be operating on or in conjunction with the mobile computing device. Memory 650 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 650 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for providing application management, the method comprising:
storing information in memory regarding a folder including a plurality of software applications with a corresponding priority order, wherein the folder is associated with a trigger condition;
receiving information over a communication network from an app player management database, the received information concerning a second user's app player management data, the second user's app player management data identifying at least one software application executed by the second user; and
executing instructions stored in memory, wherein execution of the instructions by a processor:
detects that the trigger condition associated with the folder has occurred, and
executes the plurality of software applications in the folder sequentially over a folder-wide duration of time starting from a first software application with a highest priority of the priority order and ending with a last software application with a lowest priority of the priority order, wherein executing the plurality of software applications in the folder sequentially includes waiting for a predetermined between-applications duration of time to pass between execution of each software application of the plurality of software applications.

2. The method of claim 1, wherein the trigger condition is a calendar event.

3. The method of claim 1, wherein the trigger condition is a timer event.

4. The method of claim 1, further comprising creating the folder.

5. The method of claim 4, wherein creating the folder is based on user input regarding a folder name, the one or more software applications, the priority order, and the trigger condition.

6. The method of claim 1, further comprising sending information regarding the folder over a communication network to an app player management database.

7. The method of claim 1, further comprising sending information regarding the folder over a communication network to a third party database.

8. The method of claim 1, further comprising receiving information over a communication network from an app player management database, the received information concerning a recommendation to add at least one software application to the folder.

9. An apparatus for providing application management, the apparatus comprising:
memory that stores information regarding a folder including a plurality of software applications with a corresponding priority order, wherein the folder is associated with a trigger condition;
a communication interface that receives information over a communication network from an app player management database, the received information concerning a second user's app player management data, the second user's app player management data identifying at least one software application used by the second user; and a processor coupled to the memory and to the communication interface, wherein execution of instructions stored in the memory by the processor:

detects that the trigger condition associated with the folder has occurred, and executes the plurality of software applications in the folder sequentially over a folder-wide duration of time starting from a first software application with a highest priority of the priority order and ending with a last software application with a lowest priority of the priority order, wherein executing the plurality of software applications in the folder sequentially includes waiting for a predetermined between-applications duration of time to pass between execution of each software application of the plurality of software applications.

10. The apparatus of claim 9, wherein the trigger condition is a calendar event.

11. The apparatus of claim 9, wherein the trigger condition is a timer event.

12. The apparatus of claim 9, wherein the processor executes further instructions to create the folder.

13. The apparatus of claim 12, wherein the user interface receives user input regarding a folder name, the one or more software applications, the priority order, and the trigger condition, and wherein the processor creates the folder based on the received user input.

14. The apparatus of claim 9, further comprising a communication interface that sends information regarding the folder over a communication network to an app player management database.

15. The apparatus of claim 9, further comprising a communication interface that sends information regarding the folder over a communication network to a third party database.

16. The apparatus of claim 9, further comprising a communication interface that receives information over a communication network from an app player management database, the received information concerning a recommendation to add at least one software application to the folder.

17. A non-transitory computer-readable storage medium, having embodied thereon a program executable by a processor to perform a method for providing application management, the method comprising:

storing information in memory regarding a folder including a plurality of software applications with a corresponding priority order, wherein the folder is associated with a trigger condition;

receiving information over a communication network from an app player management database, the received information concerning a second user's app player management data, the second user's app player management data identifying at least one software application executed by the second user;

detecting that the trigger condition associated with the folder has occurred;

executing the plurality of software applications in the folder sequentially over a folder-wide duration of time starting from a first software application with a highest priority of the priority order and ending with a last software application with a lowest priority of the priority order, wherein executing the plurality of software applications in the folder sequentially includes waiting for a predetermined between-applications duration of time to pass between execution of each software application of the plurality of software applications.

* * * * *